United States Patent
Tsirkin

(10) Patent No.: US 11,061,711 B2
(45) Date of Patent: Jul. 13, 2021

(54) STORAGE DEDUPLICATION FOR VIRTUAL MACHINES WITH ENCRYPTED STORAGE

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/578,536

(22) Filed: Sep. 23, 2019

(65) Prior Publication Data

US 2021/0089339 A1    Mar. 25, 2021

(51) Int. Cl.
| | |
|---|---|
| G06F 9/455 | (2018.01) |
| G06F 12/06 | (2006.01) |
| G06F 12/14 | (2006.01) |
| G06F 21/60 | (2013.01) |

(52) U.S. Cl.
CPC ...... G06F 9/45558 (2013.01); G06F 12/0646 (2013.01); G06F 12/1408 (2013.01); G06F 21/602 (2013.01); G06F 2009/45579 (2013.01); G06F 2009/45583 (2013.01);
(Continued)

(58) Field of Classification Search
CPC ............ G06F 9/45558; G06F 12/0646; G06F 21/602; G06F 12/1408; G06F 2212/1044; G06F 2009/45579; G06F 2212/151; G06F 2212/657; G06F 2009/45583
See application file for complete search history.

(56) References Cited

U.S. PATENT DOCUMENTS

| | | |
|---|---|---|
| 8,706,947 B1 | 4/2014 | Vincent |
| 8,856,544 B2 | 10/2014 | Bosch et al. |
| 8,977,842 B1 | 3/2015 | McCorkendale et al. |
| | (Continued) | |

FOREIGN PATENT DOCUMENTS

| | | |
|---|---|---|
| CN | 101976202 | 2/2011 |
| WO | 2015043376 | 4/2015 |
| WO | 2018182772 | 10/2018 |

OTHER PUBLICATIONS

Hegarty, Steve, "Backup and De-duplication of Encrypted Data", Feb. 15, 2018, Dell EMC, https://stevehegarty.wordpress.com/2018/02/15/backup-and-de-duplication-of-encrypted-data/, 4 pages.
(Continued)

*Primary Examiner* — Sean D Rossiter
(74) *Attorney, Agent, or Firm* — Lowenstein Sandler LLP

(57) ABSTRACT

Technology for performing data deduplication on encrypted storage of a virtual machine. An example method may involve: analyzing, by a guest program, a first storage block of a first virtual machine and a second storage block of a second virtual machine, wherein the first virtual machine and the second virtual machine are managed by a hypervisor; comparing, by the guest program, data of the first storage block and data of the second storage block, wherein the data of the first storage block and the data of the second storage block are encrypted using different location dependent cryptographic input; determining, by the guest program in view of the comparing, that the first storage block and the second storage block are duplicate storage blocks; and providing, by the guest program, an indication of the duplicate storage blocks to the hypervisor to cause the duplicate storage blocks to reference a common storage location.

20 Claims, 6 Drawing Sheets

(52) U.S. Cl.
CPC ............... *G06F 2212/1044* (2013.01); *G06F 2212/151* (2013.01); *G06F 2212/657* (2013.01)

(56) References Cited

U.S. PATENT DOCUMENTS

| | | |
|---|---|---|
| 9,176,889 B1 | 11/2015 | Earhart, III |
| 9,215,066 B2 | 12/2015 | Moffat et al. |
| 9,652,634 B2 | 5/2017 | Wang et al. |
| 9,940,060 B1 | 4/2018 | Colgrove et al. |
| 10,152,234 B1 | 12/2018 | Martin et al. |
| 10,404,674 B1* | 9/2019 | Bshara ............... H04L 9/0894 |
| 2009/0182789 A1 | 7/2009 | Sandorti et al. |
| 2016/0359622 A1 | 12/2016 | Bunch et al. |
| 2017/0123710 A1 | 5/2017 | Fisher |
| 2017/0169233 A1 | 6/2017 | Hsu et al. |
| 2018/0032447 A1 | 2/2018 | Kaplan et al. |
| 2018/0239772 A1 | 8/2018 | Vijayan |
| 2018/0276145 A1* | 9/2018 | Tsirkin ............... G06F 9/45558 |
| 2019/0026476 A1* | 1/2019 | Van Riel ............ G06F 21/6218 |
| 2019/0068557 A1 | 2/2019 | Noel et al. |
| 2019/0179538 A1* | 6/2019 | van Riel ............. G06F 3/0641 |
| 2020/0004568 A1* | 1/2020 | Candido de Lima, Jr. ............... G06F 8/77 |
| 2020/0310972 A1 | 10/2020 | Shanbhogue et al. |

OTHER PUBLICATIONS

Xiao, Jidong et al., "Security Implications of Memory Deduplication in a Virtualized Environment", 2013, The College of William and Mary, 12 pages.

Ning et al, "Group-Based Memory Deduplication against Covert Channel Attacks in Virtualized Environments," 2016, Institute of Information Engineering, https://ieeexploreieee.org/document/7846946, 7 pages.

Fischer et al., "On the Detection of Applications in Co-Resident Virtual Machines via a Memory Deduplication Side-Channel", 2018, Department of Computer Science University of Hamburg, Germany, https://sys.informatik.uni-hamburg.de/publications/2018/2018-12-Lindemann-Application-Detection.pdf, 15 pages.

Jin et al., "H-SVM: Hardware-assisted Secure Virtual Machines under a Vulnerable Hypervisor", Jan. 9, 2015, IEEE, https://ieeexplore.ieee.org/abstract/document/7005439, 14 pages.

* cited by examiner

STORAGE DEDUPLICATION FOR VIRTUAL MACHINES WITH ENCRYPTED STORAGE

TECHNICAL FIELD

The present disclosure is generally related to data storage management, and more particularly, to the deduplication of encrypted data.

BACKGROUND

Modern computer systems perform data deduplication to improve the utilization of data storage resources. Data duplication is a technique that removes duplicate copies of repetitive data to enable more data to be stored within a data storage device. The technique of data duplication may involve identifying chunks of data (e.g., byte patterns) that are stored within the data storage resource. The chunks are compared to other chunks stored within the data storage resource and when a match occurs, redundant chunks are replaced with small references that point to one of the other redundant chunks. Given that the same chunk or byte pattern may occur dozens, hundreds, or even thousands of times the amount of storage resources consumed to store the data can be greatly reduced using deduplication.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
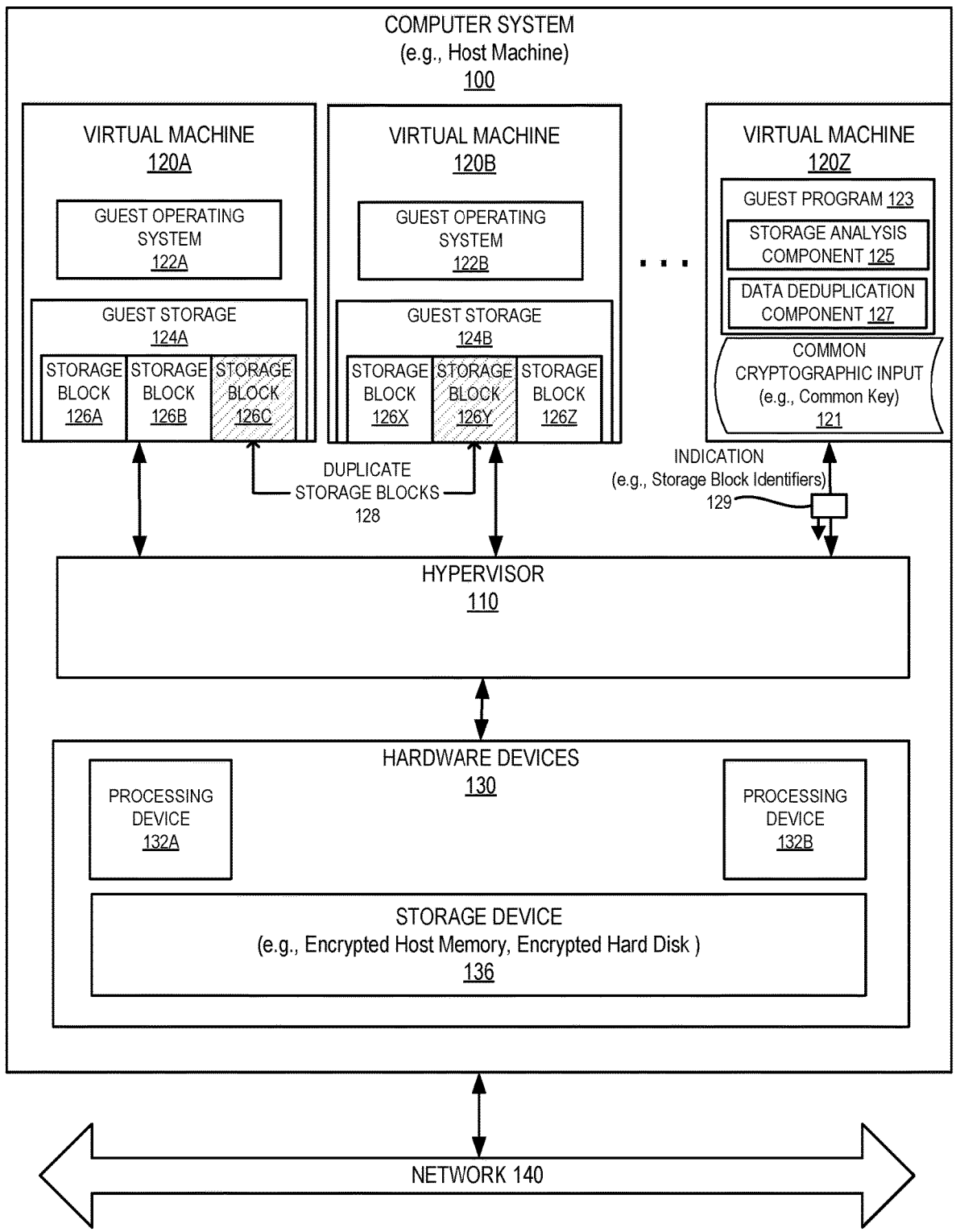
FIG. 1 depicts a high-level block diagram of an example computer system architecture that performs data deduplication of a storage device while the data in the storage device is encrypted, in accordance with one or more aspects of the present disclosure.

Computer systems often use cryptographic functions to encrypt data stored within a storage device. The cryptographic functions may use variations in cryptographic input so that two instances of the same content appear different after they are encrypted. Having different encrypted versions of the same content may cause many data deduplication techniques to be unable to properly or efficiently detect duplicates in the underlying content. In some examples, the cryptographic function may be performed by a combination of hardware and lower-level code (e.g., firmware) and may use cryptographic keys that may be concealed from higher-level code (e.g., hypervisor). The higher-level executable code may request the data and the hardware may or may not decrypt the data depending on the executable code requesting access. For example, if the data is associated with a virtual machine then a request by the guest operating system of the virtual machine may be fulfilled with a decrypted version of the data but a request from the hypervisor may be fulfilled with an encrypted version of the data. This causes the hypervisor to be unable to compare the decrypted versions of the data and causes hypervisor level data deduplication to be ineffective.

Aspects of the present disclosure address the above and other deficiencies by providing technology to enable a hypervisor to use the guest program (e.g., guest operating system) to perform data deduplication on encrypted storage. In one example, the guest program may perform the data comparisons and work with the hypervisor (e.g., para virtualization) to perform data deduplication on encrypted storage blocks. The storage blocks may be any portion of data storage that is capable of storing data and may be based on volatile or non-volatile data storage devices. The data of the storage blocks may be encrypted using a cryptographic function in view of one or more cryptographic inputs (e.g., location based key and a shared key). The cryptographic function may be executed by the hardware and some or all of the cryptographic input (e.g., decryption keys) may be concealed or temporarily hidden from the hypervisor, guest program, guest operating systems, or a combination thereof. The hardware may decrypt the data when a virtual machine attempts to access the data (e.g., guest program) and may avoid decrypting the data when the hypervisor attempts to access the data.

The guest program may be initiated by the hypervisor and may analyze storage blocks from multiple different virtual machines to find the duplicate storage blocks. Each of the storage blocks may be encrypted using different cryptographic input and storage blocks with identical unencrypted content (e.g., plaintext) may have different decrypted content (e.g., cipher text). The guest program may be provided with access to the unencrypted content and the hypervisor may be provided access to the decrypted content. This may prohibit the hypervisor from detecting equivalent content and the guest program may function as a proxy for comparing the different storage blocks to determine whether they are duplicate storage blocks. The guest program may initiate an update to one or more of the duplicate storage blocks to cause the duplicate storage blocks to reference a common storage location. This may involve indicating to the hypervisor which of the storage blocks are duplicates so that the hypervisor can associate multiple duplicate storage blocks to the same physical storage of the host and remove some or all of the duplicates.

The guest program performing the comparisons may be executed by a targeted virtual machine that is the target of the storage deduplication (e.g., VM affected by deduplication process) or may be executed by an auxiliary virtual machine. The auxiliary virtual machine may or may not have storage that is affected by the deduplication and in one example may be a lean virtual machine. The lean virtual machine may have a reduced processing and storage footprint and may be dedicated to performing the storage deduplication tasks. The lean virtual machine may execute the guest program (e.g., guest driver, guest kernel, executable code, etc.) to perform tasks for the deduplication without having all of the features of a full guest operating system. In one example, the hypervisor may initiate or activate the virtual machine performing the deduplication in response to detecting reduced storage availability (e.g., below a threshold value) and may deactivate the virtual machine when the storage availability recovers (e.g., exceeds a threshold value).

The systems and methods described herein include technology that enables data deduplication in a security enhanced computing environment. In particular, aspects of the present disclosure may enable a hypervisor to perform data deduplication on encrypted storage blocks without accessing decrypted versions of the storage block data. Aspects of the present disclosure may be performed on volatile data storage or non-volatile data storage and may enhance a computer system's ability to perform data deduplication on memory resources, hard disk resources, solid-state storage resources, other storage resources, or a combination thereof.

Various aspects of the above referenced methods and systems are described in details herein below by way of examples, rather than by way of limitation. The examples provided below discuss a virtualized computer system where the data deduplication may be performed by aspects of a virtual machine, hypervisor, a host operating system, or a combination thereof. In other examples, the data deduplication may be performed in a non-hardware virtualized computer system that is absent a hypervisor and may include other virtualization or emulation features (e.g., operation system level virtualization).

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted. Computer system 100 may be a single host machine or multiple host machines that may be arranged in a homogenous or non-homogenous group (e.g., cluster or grid). Computer system 100 may include a rack-mount server, a workstation, a desktop computer, a notebook computer, a tablet computer, a mobile phone, a palm-sized computing device, a personal digital assistant (PDA), etc. In one example, computer system 100 may be a computing device implemented with x86 hardware. In another example, computer system 100 may be a computing device implemented with PowerPC®, SPARC®, or other hardware. In the example shown in FIG. 1, computer system 100 may include hypervisor 110, virtual machines 120A-Z, hardware devices 130, and network 140.

Hypervisor 110 may also be known as a virtual machine monitor (VMM) and may provide virtual machines 120A-Z with access to one or more features of hardware devices 130. In the example shown, hypervisor 110 may run directly on the hardware of computer system 100 (e.g., bare metal hypervisor). In other examples, hypervisor 110 may run on or within a host operating system (not shown). Hypervisor 110 may manage virtual machines 120A-Z and provide them with access to system resources. Each of the virtual machines 120A-Z may be based on hardware emulation and may support para-virtualization, operating system-level virtualization, or a combination thereof. Virtual machines 120A-B may have the same or different types of guest operating systems 122A-B.

Guest operating systems 122A-B may be any program or combination of programs that are capable of managing computing resources of a virtual machine. In one example, guest operating systems 122A-B may include Linux®, Solaris®, Microsoft Windows®, Apple Macintosh, other operating system, or a combination thereof. Guest operating systems 122A-B may manage the execution of multiple processes that provide one or more computing services.

Guest program 123 may be a part of a full guest operating systems (e.g., 122A-B) or may be executable code that is separate from a full guest operating system as shown in FIG. 1. Guest program 123 may be any code that is capable of being executed by a virtual machine and may or may not include a guest kernel, guest applications, other program, or a combination thereof. Guest program 123 may comprise one or more kernel space programs (e.g., memory driver, network driver, file system driver) for interacting with emulated hardware or physical hardware. In one example, guest program 123 may be similar to a micro kernel or other kernel that provides a near-minimum amount of software that can provide mechanisms to manage storage resources. The mechanisms may include low-level address space management, thread management, inter-process communication (IPC), other services, or a combination thereof. Guest program 123 may be capable of managing, interacting, or interfacing with virtual devices (e.g., emulated devices), physical devices (e.g., actual tangible devices), other devices, or a combination thereof.

Hypervisor 110 may configure computer system 100 so that guest program 123 may be configured to access guest assigned to multiple different virtual machines 120A-Z. For example, guest program 123 may have access to guest storage of virtual machine 120Z and also access to guest storage of virtual machines 120A and 120B (e.g., guest storage 120A-B).

Guest storage 124A-B may be any virtual data storage, logical data storage, physical data storage, other storage, or a combination thereof for storing, organizing, or accessing data. Guest storage 124A-B may each correspond to a portion of storage device 136 that has been designated for use by the respective virtual machine. Guest storage 124A-B may function as volatile data storage or non-volatile data storage as discussed below in regards to storage device 136. Guest storage 124A-B may be organized into one or more storage blocks 126A-Z.

Storage blocks 126A-Z may be used for storing, organizing, or accessing data and may include a contiguous or non-contiguous sequence of bytes or bits. Each of the storage blocks 126A-Z may be referred to as a guest storage block and may correspond to a logical data storage unit, physical data storage unit, or a combination thereof. In one example, the logical storage unit (e.g., guest page) may include data in an unencrypted form and may correspond to a physical storage unit (e.g., host page frame) that includes the data in an encrypted form. A logical data storage unit may have a block size which may be the same or different from a block size of the underlying physical data storage unit. The block size may be a fixed-size, such as a particular integer value (e.g., 4 KB) or may be a variable-size that varies within a range of integer values. In one example, storage blocks 126A-Z may be memory blocks and each memory block may correspond to an individual memory page, multiple memory pages, or a portion of a memory page. The memory pages may be guest physical memory or guest physical memory pages and may correspond one-to-one or many-to-one with a hypervisor memory page (e.g., host memory page). In another example, each of the storage blocks 126A-Z may correspond to a portion (e.g., sector, logical unit, region, volume, partition, etc.) of a mass storage device (e.g., hard disk) or other storage device. In either example, storage blocks 126A-Z may include duplicate storage blocks 128.

Duplicate storage blocks 128 may be different storage blocks that store equivalent data. The equivalent data may be the same identical data (e.g., bit-for-bit match) or may be substantially similar data (e.g., subset of data is bit-for-bit match). Substantially similar data is data that includes one or more portions that are identical and one or more portions that are not identical. The one or more portions that are not identical may be referred to as different data and may be at the beginning, end, or other position within the storage block. The different data may be padding data (e.g., data to fill remaining portion of storage block), prior use data (e.g., data left over from earlier write), descriptive data (e.g., little-endian, big-endian), other data, or a combination thereof. For example, duplicate storage blocks 128 may correspond to storage block 126C of virtual machine 120A and storage block 126Y of virtual machine 120B. Storage blocks 126C and 126Y may have padding data at the beginning or end that does not match one another but the remaining portions of data in the respective storage blocks may be identical.

Guest program 123 may be configured to detect duplicate storage blocks 128 using storage analysis component 125 and data deduplication component 127. Storage analysis component 125 may analyze storage blocks 126A-Z and select storage blocks that have an increased chance (e.g., higher probability) of containing duplicate content. Storage analysis component 125 may also perform data comparisons on the selected storage blocks. Data deduplication component 127 may determine based on the comparison whether the storage blocks are duplicates. Data deduplication component 127 may add the storage blocks to a set of one or more duplicate blocks and may provide an indication 129 of the duplicate storage blocks 128 to hypervisor 110.

Indication 129 may include one or more signals for indicating to hypervisor 110 that one or more storage blocks accessible to the guest program are duplicates. The signal may be a message, interrupt, notification, exception, trap, other signal, or a combination thereof. The signal may be initiated by a virtual machine and transmitted to the hypervisor (as shown) or may be initiated by the hypervisor and a response signal is transmitted from the virtual machine to the hypervisor. In one example, indication 129 may correspond to a system call, hypercall, other function call, or a combination thereof. Indication 129 may be transmitted before, during, or after a duplicate storage block is detected and may be any of the types discussed below.

In one example, indication 129 may be a first type of indication and may be a message that is transmitted from a virtual machine to the hypervisor. The message may correspond to particular set of duplicate storage blocks and may indicate the one or more storage blocks that correspond to an instance of duplicates (e.g., all blocks have equivalent data). The message may include identification data (e.g., identifiers) for the one or more storage blocks or storage block ranges. Indication 129 may include a series of indications and each indication in the series may identify an individual storage block or an individual range of storage blocks. Indication 129 may be transmitted in response to detecting a particular storage block is duplicated and may indicate to the hypervisor that the at least one storage block or storage block pair is a duplicate.

In another example, indication 129 may be a second type that is similar to the first type and may batch multiple different sets of duplicate storage blocks. The message may be referred to as a batched message and may include multiple storage blocks that are associated with different sets of duplicate storage blocks (e.g., set A has pattern X and set B has pattern Y). Batched messages may be advantageous because they may reduce the communications overhead (e.g., I/O or context switches) that occur between virtual machine 120Z and hypervisor 110. Indication 129 may be transmitted from virtual machine 120Z to hypervisor 110 in response to a quantity of duplicate storage blocks, a quantity of sets, or a combination thereof satisfying one or more threshold values (e.g., at, above, or below threshold value). The threshold value may be a quantity, ratio, percentage, or other value and may be based on a size of the storage (e.g., total storage, allocated storage, unallocated storage, available storage) and may be a particular amount of blocks (e.g., storage block count) or a particular amount of space occupied by the storage blocks (e.g., buffer space limit). The threshold values may include one or more integers, percentages, ratios, other values, or a combination thereof. The values may be relative to the size or limit of storage device 136, storage blocks 126A-Z, processing devices 132A-B, computer system 100, hypervisor 110, virtual machines 120A-Z, guest program 123, heap, page, buffer, other data structure, or a combination thereof.

In yet another example, indication 129 may be a third type that includes one or more signals that correspond to an updated shared data structure representing the status of storage blocks. The shared data structure may indicate to the hypervisor which storage blocks are duplicates, are not duplicates, or a combination thereof. Indication 129 may include a first signal that may be sent prior to detecting duplicates storage blocks and one or more second signals that may be sent after one or more duplicate storage blocks are detected. The first signal may be in the form of a message that is transmitted during an initialization of guest program 123 (e.g., guest operating system) or initialization of a particular storage management module of guest program 123. The first signal may include information (e.g., reference, pointer) identifying the shared data structure that represents guest storage 124A or represents multiple guest storages 124A-B. When guest program 123 detects storage blocks that are duplicates, the virtual machine 120Z may update the shared data structure to indicate to hypervisor 110 that the storage blocks of the other virtual machines includes duplicates. Hypervisor 110 may subsequently access the shared data structure after the duplicate storage blocks are detected. In one example, hypervisor 110 may listen for second signals (e.g., modification events) that indicate the shared data structure has been updated. In another example, hypervisor 110 may not listen for second signals and may access the shared data structure when hypervisor 110 determines storage blocks are needed (e.g., available storage blocks fall below a threshold or storage faults exceed a threshold).

The shared data structure may be modified by one or more of the virtual machines and may be accessible to the hypervisor. The shared data structure may be an array (e.g., bitmap), a linked list, a table, a matrix, other data structure, or a combination thereof. The shared data structure may include an element (e.g., bit flag, entry, or node) for each of the storage blocks and the element may indicate whether the storage block is duplicated, unduplicated, or other state. The shared data structure may be stored in shared storage that may be a portion of guest storage, hypervisor storage, other storage, or a combination thereof. In one example, the shared data structure may be stored in guest storage of virtual machine 120Z. In another example, the shared data structure may be stored in data storage of the hypervisor (e.g., hypervisor storage) and may be temporarily accessible (e.g., mapped) to one or more of the virtual machines. In either example, one or more of the virtual machines and the hypervisor may have access to the shared storage and the shared storage may or may not be encrypted. There may be a single shared data structure that corresponds to one or more groups of virtual machines (e.g., one or more different tenants) or multiple shared data structures that each correspond to a single group of virtual machines (e.g., shared data structure per tenant).

Hardware devices 130 may provide hardware functionality for performing computing tasks related to the data deduplication of storage blocks. Hardware devices 130 may include one or more storage devices 136 and one or more processing devices 132A, 132B, or combination thereof. One or more of these hardware devices may be split up into multiple separate devices or consolidated into one or more hardware devices. Some of the hardware devices shown may be absent from hardware devices 130 and may instead be partially or completely emulated by executable code.

Storage device 136 may include volatile or non-volatile data storage devices. Volatile data storage devices (e.g., non-persistent storage) may store data for any duration of time but may lose the data after a loss of power. Non-volatile data storage devices (e.g., persistent storage) may store data for any duration of time and may retain the data beyond a loss of power. In one example, storage device 136 may include one or more registers (e.g., processor registers) or memory devices (e.g., main memory, auxiliary memory, adapter memory). In another example, storage device 136 may include one or more mass storage devices, such as hard drives (hard disk drive (HDD)), solid-state storage (e.g., Solid State Drives (SSD), flash drive), other data storage devices, or a combination thereof. In a further example, storage device 136 may include a combination of one or more registers, one or more memory devices, one or more mass storage devices, other data storage devices, or a combination thereof that may or may not be arranged in a cache hierarchy.

Processing devices 132A and 132B may include one or more processors that are capable of accessing storage device 136 and executing instructions of guest program 123. Processing devices 132A and 132B may be a single core processor that is capable of executing one instruction at a time (e.g., single pipeline of instructions) or may be a multi-core processor that simultaneously executes multiple instructions. The instructions may encode arithmetic, logical, or I/O operations and may be used to execute a cryptographic function that performs encryption or decryption of data within storage device 136. Processing devices 132A-B and storage device 136 may interact with one another to store data in an encrypted form and provide access to the stored data in either an encrypted form or unencrypted form based on the context of the process attempting to access the data (e.g., VM process or hypervisor process).

One or more of the hardware devices 130 may execute a cryptographic function to encrypt or decrypt the data before, during, or after it is stored in storage device 136. The cryptographic function may be any function that is suitable for use in a standardized or proprietary cryptographic protocol and may involve one or more mathematical manipulations of content data. The cryptographic function may map data of an arbitrary size to a bit sequence of a fixed size or variable size. In one example, the cryptographic function may be a cryptographic function that takes a content message as input and outputs a value, which may be referred to as cipher text, a digest, hash, or a message digest. The cryptographic function may include a private key cryptographic function a public key cryptographic function, other cryptographic function, or a combination thereof. In one example, one or more of the hardware devices 130 may execute the cryptographic function without providing higher-level executable code (e.g., guest program 123, guest operating system 122A-B, hypervisor 110, or host operating system) access to the cryptographic function, cryptographic input, or a combination thereof. This is advantageous because it may reduce access to the cryptographic keys and unencrypted data, which may enhance security.

In one example, the cryptographic function may be an "in-place" cryptographic function that may avoid copying data of a storage block to another location during the execution of the cryptographic function (e.g., during data encryption or decryption). The in-place cryptographic function may transform data within a storage block of the storage device without using auxiliary data storage in the storage device. This may involve the content of the storage block being overwritten by the output of the cryptographic function while the cryptographic function executes. In one example, the in-place cryptographic function may use only the storage space of a single storage block and may update data within the storage block by swapping or replacing portions of data. In another example, the in-place cryptographic function may use a small amount of auxiliary data within the storage block or elsewhere for indices or pointers (e.g., counter pointers). The small amount of auxiliary storage space may be proportionate to the size of the unencrypted content and in one example may be O(log n), O(n), or other portion of "n", wherein "n" is the number of bits or bytes of the unencrypted content data. In any of the above example, the cryptographic function may encrypt or decrypt data using cryptographic input (e.g., one or more cryptographic keys).

The cryptographic input may be any cryptographic bit sequence and may include encryption keys, decryption keys, public keys, private keys, symmetric keys, asymmetric keys, other cryptographic data, or a combination thereof. The cryptographic input may include or be generated or derived from one or more initialization vectors, starting variables, other data, or a combination thereof. The cryptographic input may include or be based on the spatial data, temporal data, or contextual data as discussed in more detail below. In one example, the cryptographic input may include a location dependent cryptographic input that includes a bit sequence based on spatial data that is specific to one or more storage blocks, storage devices, processing devices, other hardware devices, or combination thereof. For example, cryptographic input may be based on data that is permanently or temporarily associated with the hardware device, such as hardware identification information or a physical memory address of a particular physical storage block (e.g., host memory frame or disk sector). The latter example may cause each storage block to be associated with different cryptographic input and therefore cause the cipher text of identical content to be different after it is encrypted.

The cryptographic input used to encrypt or decrypt data is accessible to the hardware device performing the cryptographic function and may or may not be accessible to one or more of the programs (e.g., guest program 123, guest operating systems 122A-B, hypervisor 110, or host operating system). In one example, the cryptographic input may be a cryptographic key that functions as an encryption key, a decryption key, or a combination thereof and the key may be accessible to a hardware device without being accessible to any of the programs. The programs may or may not provide cryptographic input to the hardware to derive the cryptographic key and the program may be unable to derive the cryptographic key in the absence of the hardware device or using a different hardware device. In another example, one or more of the cryptographic keys may be accessible to a program executed by the virtual machine (e.g., guest program 123 or guest operating systems 122A-B) without being accessible to the hypervisor 110. In yet another example, the hypervisor may have access to a cryptographic key to encrypt the data without having access to a cryptographic key to decrypt the data (e.g., access to encryption key but not decryption key). In these examples, the programs may have access to common cryptographic input 121 (e.g., common key) that may be used individually or in combination with the location dependent cryptographic input to create or derive the one or more cryptographic keys used by the hardware device.

Common cryptographic input 121 may be used to encrypt or decrypt data and may not be specific to individual storage block as discussed in regards to some of the location dependent cryptographic input. Common cryptographic input 121 may be based on the spatial, temporal, or contextual data. For example, common cryptographic input 121 may be a cryptographic key for a particular virtual machine and used to encrypt or decrypt some or all of the storage blocks associated with the particular virtual machine. In one example, common cryptographic input 121 may be a shared cryptographic key that is shared by multiple virtual machines associated with an entity (e.g., all VMs of a tenant/consumer/client). In another example, common cryptographic input 121 may include multiple different shared keys (e.g., a key chain) and each of the keys may correspond to a particular one of the virtual machines. In either example, guest program 123 may have access to common cryptographic input 121 and use the common cryptographic input 121 to access storage blocks of other virtual machines.

Network 140 may be a public network (e.g., the internet), a private network (e.g., a local area network (LAN) or wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
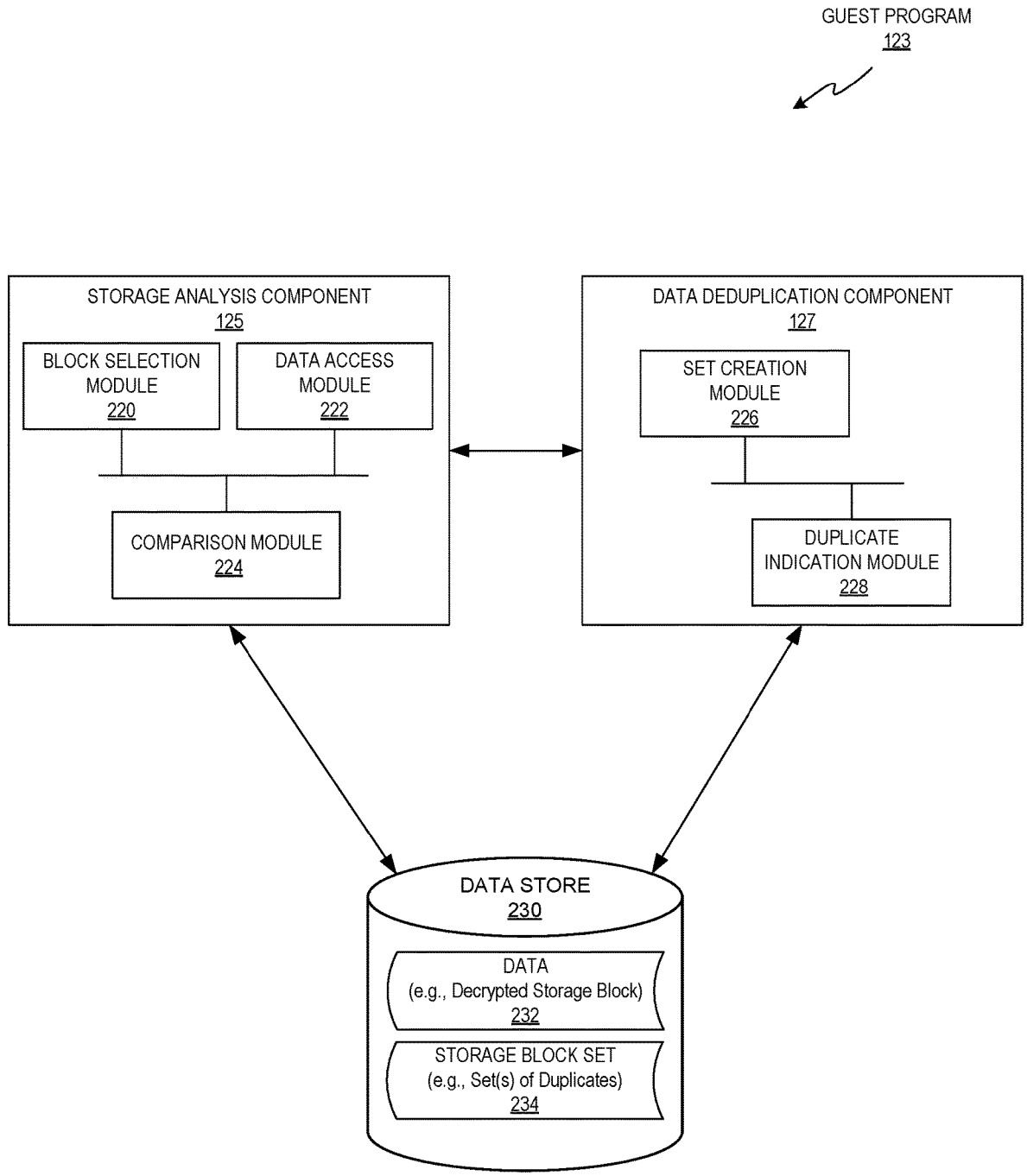
FIG. 2 depicts a block diagram illustrating components and modules of an example guest program (e.g., a guest operating system, driver, or executable code) that is executed by a virtual machine, in accordance with one or more aspects of the present disclosure.

FIG. 2 is a block diagram illustrating example components and modules of guest program 123, in accordance with one or more aspects of the present disclosure. As discussed above, guest program 123 may be executable code and may or may not be part of a full operating system, a lightweight operating system, or a standalone kernel (e.g., micro-kernel, just enough Operation System (JeOS)). Guest program 123 may be executed by a virtual machine in a mode or space associated with the virtual machine (e.g., one or more virtual machine processes). The virtual machine may be configured to enable guest program 123 to access storage resources of another virtual machine. In the example shown, guest program 123 may include a storage analysis component 125 and a data deduplication component 127.

Storage analysis component 125 may enable guest program 123 to analyze data storage to identify portions of the data storage that contain duplicate data. The data storage may be accessible to a virtual machine executing the guest program and may be assigned and in use by other virtual machines. Storage analysis component 125 may include a block selection module 220, data access module 222, and a comparison module 224.

Block selection module 220 may analyze data associated with one or more storage blocks to identify storage blocks that have an increased probability of containing duplicate data. The data associated with the storage blocks may be any data that relates to a particular storage block or group of storage blocks and may include temporal data, spatial data, contextual data, other data, or a combination thereof. The temporal data associated with a storage block may be any data related to a time or frequency of access, modification, creation, deletion, or other operation that affects the one or more storage block. The spatial data may be any data that relates to the location of one or more storage blocks with respect to the storage device. The locations may be a particular location (e.g., address) or a relative location (e.g., adjacent to) and may include logical locations (e.g., virtual address, guest physical address) or physical locations (e.g., host physical address) of the storage block. The contextual data may be any data that provides a context of a storage block or content within the storage block and may indicate a particular thread, process, user, host, virtual machine, or a combination thereof is associated with a specific storage block. The data associated with the storage blocks may be determined by guest program 123 by accessing, scanning, searching, or monitoring the storage blocks or may be received from a hypervisor or host operating system (e.g., hypervisor hints).

Block selection module 220 may calculate a similarity score by analyzing and/or weighting the temporal data, spatial data, or contextual data associated with the storage blocks. The similarity score may be a probabilistic value that indicates the probability that separate storage blocks or groups of storage blocks include the same or similar content data. The probabilistic value may be represented in any form such as decimals, fractions, percentages, integers, ratios, other forms, or combination thereof. Block selection module 220 may select one or more storage blocks in view of the similarity score. For example, block selection module 220 may select one or more storage blocks that exceed (e.g., above or below) a predetermined threshold. Block selection module 220 may identify particular storage blocks or groups of storage blocks and may add them to a set of candidate storage blocks.

Data access module 222 may enable guest program 123 to access data of the selected storage blocks. The data of a selected storage block may include data stored internal to the storage block and/or data that is stored external to the storage block. The data stored external to the storage block may be associated with the storage block and used for managing or organizing storage blocks (e.g., metadata, time data, dirty data, fingerprint data). Data access module 222 may access the data of the storage blocks so that the storage blocks can be compared to identify duplicate data. As discussed above, the storage blocks may be encrypted using different cryptographic input and this may cause storage blocks that have identical unencrypted versions of data to have different encrypted versions of the data. Data access module 222 may enable guest program 123 to request access to the storage blocks in the context of the virtual machine (as opposed to hypervisor) to ensure that the data being accessed is decrypted before being access by comparison module 224.

Comparison module 224 may enable guest program 123 to perform one or more comparisons of unencrypted data from different storage blocks (e.g., data 232). When comparing the content data of a storage block, not all of the data may need to be compared because some of the data within a storage block may be extraneous data (e.g., padding or unoccupied). Therefore, storage blocks with similar but non-identical content may still be determined to have equivalent data and be identified as duplicate storage blocks because they contain at least some identical content. In one example, comparison module 224 may directly compare the data of a storage block with the data of one or more other storage blocks. In another example, comparison module 224 may indirectly compare different storage blocks by comparing data representative of the data in the storage blocks. The representative data may be a hash of the decrypted content or a hash of one or more portions of the decrypted data of the storage blocks (e.g., just beginning or end portions).

Data deduplication component 127 may enable guest program 123 to interact with a hypervisor or host operating system to remove some or all of the duplicate content. In the example shown in FIG. 2, data deduplication component 127 may include a set creation module 226 and a duplicate indication module 228.

Set creation module 226 may enable guest program 123 to add duplicate storage blocks to a storage block set 234. Storage block set 234 may be a data structure that includes one or more lists, tables, matrices, arrays, pointers, ranges, values, flags, other data structures, or a combination thereof. Storage block set 234 may be generated by guest program 123 and stored in data store 230 or may be generated by another program (e.g., hypervisor) and shared with guest program 123 as discussed above (e.g., shared data structure). Set creation module 226 may access and update storage block set 234 to add one or more storage blocks that have duplicate content. Adding the storage blocks may involve adding identification data for the storage block to the storage block set 234. The identification data may include identification data of the storage blocks (e.g., storage identifier, storage address, offset), the virtual machines (e.g., VM ID, process ID, owner), the storage devices, the duplicated data (e.g., bit pattern), other data, or a combination thereof. In one example, storage block set 234 may correspond to a particular instance of duplicate storage blocks and all blocks in the set may be a duplicate of one another. In another example, storage block set 234 may correspond to multiple different instances of duplicates storage blocks and each instance of duplicates may be referred to as a duplicate subset. In either example, the one or more storage block sets 234 may be provided to a hypervisor using duplicate indication module 228.

Duplicate indication module 228 may enable guest program 123 to provide an indication to the hypervisor that indicates the multiple virtual machines include duplicate storage blocks. As discussed above, the indication may be any message or signal that indicates the existence of duplicate storage blocks and may or may not identify one or more of the storage blocks that are duplicates. Duplicate indication module 228 may provide the indication by transmitting the identification data of storage block set 234 to the hypervisor or by providing an indication that references a shared storage block set 234 that has been updated. The shared storage block set 234 may be stored in shared storage that is accessible by both the virtual machine executing the guest program 123 and by the hypervisor. In one example, duplicate indication module 228 may provide an indication to the hypervisor by initiating a hypercall. In another example, duplicate indication module 228 may provide the indication by updating a particular storage location (e.g., shared data structure).

Providing the indication of the duplicate storage blocks is discussed in detail in regards to FIG. 1 (e.g., indication 129) and may cause the hypervisor to deduplicate the storage blocks. The hypervisor may deduplicate the storage blocks by updating one or more storage structures to remove one or more of the duplicate storage blocks. The storage structure may include one or more references that correspond to the one or more duplicate storage blocks. Each reference may identify (e.g., point to) the beginning, middle, end, or other portion of the one or more storage blocks. When a first storage block and a second storage block are determined to be duplicates, the hypervisor or guest program may update the storage structure to change a reference for the first storage block to subsequently reference the same location as the second storage block. As a result, the references for the first storage block and the second storage block may point to a common storage location. This may free the first block by de-referencing the first storage block so that it can be subsequently reused, reallocated, removed, flushed, wiped, or other action.

The storage structure modified by the hypervisor in view of the guest program indication may be a memory cache data structure or it may be another storage structure that corresponds to a caching system, a file system, a database system, other storage system, or a combination thereof. In one example, the storage structure may be an address-translation cache (e.g., Translation Lookaside Buffer (TLB)) that translates between virtual and physical memory locations (e.g., memory addresses). The memory cache data structure may include one or more pointer entries (e.g., Page Table Entries (PTE)) that point to respective storage blocks (e.g., memory pages). After detecting duplicates, duplicate indication module 228 may transmit an indication that causes hypervisor 110 to update the memory cache data structure by invalidating the pointer entries for one or more of the duplicate storage blocks and may flush the address-translation cache to remove references to or the content of the duplicates.

Figure 3:
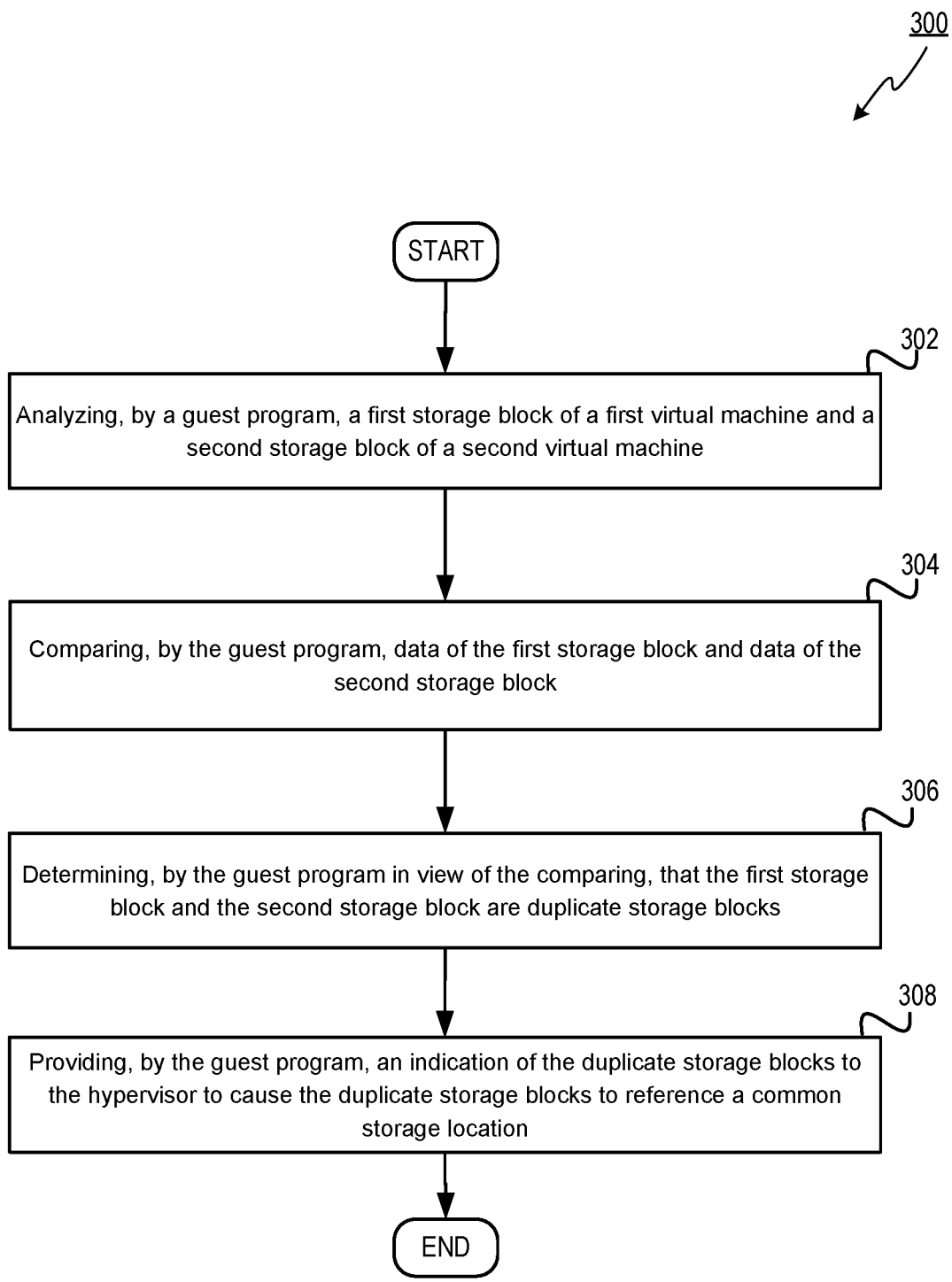
FIG. 3 depicts a flow diagram of an example method for performing data deduplication of an encrypted storage device, in accordance with one or more aspects of the present disclosure.

FIG. 3 depicts a flow diagram of an illustrative example of a method 300 for performing data deduplication of a storage device while the data in the storage device is encrypted, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a guest program executing on a virtual machine as shown in FIG. 1.

Method 300 may be performed by processing devices of a server device or a client device and may begin at block 302. At block 302, a processing device executing the guest program may analyze a first storage block of a first virtual machine and a second storage block of a second virtual machine. Both the first virtual machine and the second virtual machine may be managed by the same hypervisor, host operating system, or a combination thereof. The first storage block and the second storage block may each include encrypted data that is accessible to the guest program in a decrypted form and is inaccessible to the hypervisor in the decrypted form. For example, when the guest program requests access to the data of the first and second storage blocks the plaintext version of the data may be returned. But when the hypervisor requests access to the data the request may be denied or a ciphertext version of the data may be returned. In one example, the guest program may be a guest operating system executed by a virtual machine that is effected by the deduplication. In another example, the guest program may be a guest kernel executed by another virtual machine that is not effected by the deduplication (e.g., auxiliary virtual machine, lean virtual machine). In either example, each of the virtual machines may share the same common cryptographic input (e.g., shared VM key) for encrypting the data of the storage blocks and the storage blocks may be selected in view of a heuristic that uses access time, modification times, other data, or a combination thereof.

At block 304, the processing device executing the guest program may compare the data of the first storage block and data of the second storage block. The data of the first storage block and the data of the second storage block may be encrypted using different location dependent cryptographic input. The data may be decrypted and/or encrypted by a hardware device using a cryptographic key that is accessible to the hardware device and inaccessible to the guest program, guest operating systems, hypervisor, host operating system, other program or a combination thereof. The cryptographic key may be based on the location dependent cryptographic input (e.g., storage block specific key) and on a common cryptographic input (e.g., shared VM key). In one example, the different location dependent cryptographic input may correspond to a host physical address of the respective first and second storage blocks.

The comparisons may be done by the guest program and the results of the comparisons may be indicated to the hypervisor. This may be advantageous because the data of the storage blocks may be stored in guest storage of the virtual machines and may be accessible to a process of the virtual machines without being accessible to a process of the hypervisor, host operating system, or another virtual machine (e.g., a VM without access to shared VM key). The processing device may directly or indirectly compare multiple storage blocks. Directly comparing the data may involve comparing data of the first storage block with data of the second storage block. Indirectly comparing the data may involve comparing data that represents the data of the first storage block (e.g., first hash) with data that represents the data of the second storage block (e.g., second hash).

At block 306, the processing device executing the guest program may determine, in view of the comparing, that the first storage block and the second storage block are duplicate storage blocks. In one example, the duplicate storage blocks may be duplicate guest physical memory pages from different virtual machines. Each of the guest physical memory pages may correspond to an underlying hypervisor memory page and the hypervisor memory page may correspond to an underlying memory frame of host memory. The data present in each of the host memory frames may be encrypted using different location based cryptographic input and the resulting ciphertext versions of the data may be different even though the plaintext versions may be the same.

At block 308, the processing device executing the guest program may provide an indication of the duplicate storage blocks to the hypervisor to cause the duplicate storage blocks to reference a common storage location. In one example, the first and second storage blocks may be added to a set of duplicate storage blocks and the set may be provided to the hypervisor. Providing the indication may involve the guest program making a hypercall to the hypervisor and the hypercall may indicate one or more guest physical addresses of the duplicate storage blocks. The indication may cause the hypervisor to update one or more of the duplicate guest physical memory pages to reference a common physical address in host memory.

The processing device may update the references of the first storage block or second storage block while executing a process or thread of the hypervisor or host operating system. In one example, the first storage block and the second storage block may be duplicate memory pages and updating the reference may remove one of the duplicate memory pages. In one example, updating the reference may involve updating a page table entry (PTE) and invalidating the corresponding entry within a translation lookaside buffer (TLB). The page table entry may correspond to the first storage block and after the update may include a pointer to the physical address of the second storage block instead of the physical address of the first storage block. Updating the reference may also involve invalidating all the page table entries that correspond to the first storage block and the second storage block and flushing the translation lookaside buffer. Responsive to completing the operations described herein above with references to block 308, the method may terminate.

Figure 4:
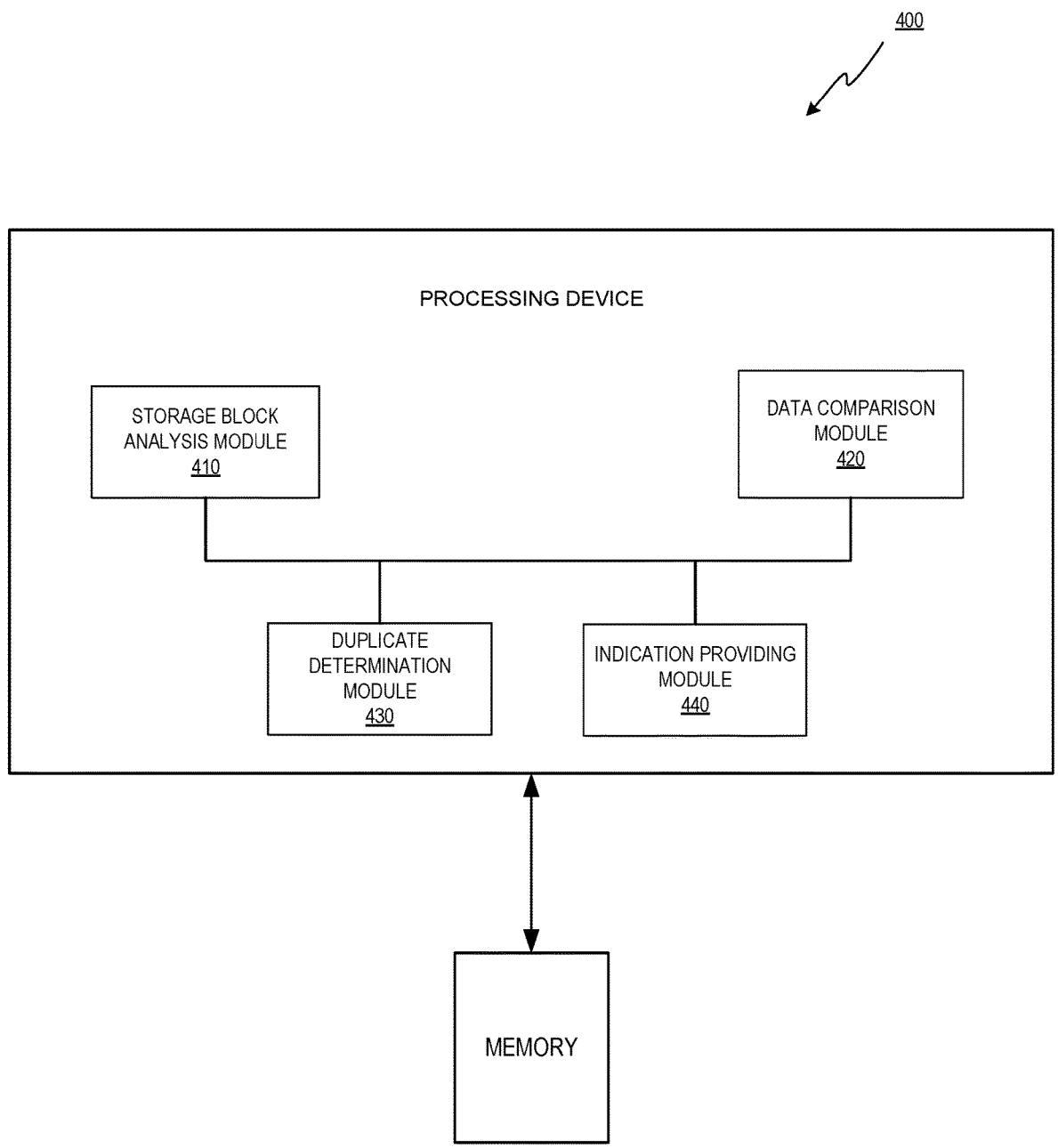
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computer system 100 and may include one or more processing devices and one or more memory devices. In the example shown, computer system 400 may include a storage block analysis module 410, a data comparison module 420, a duplicate determination module 430, and an indication providing module 440.

Storage block analysis module 410 may enable a processing device executing the guest program to analyze a first storage block of a first virtual machine and a second storage block of a second virtual machine. Both the first virtual machine and the second virtual machine may be managed by the same hypervisor, host operating system, or a combination thereof. The first storage block and the second storage block may each include encrypted data that is accessible to the guest program in a decrypted form and is inaccessible to the hypervisor in the decrypted form. For example, when the guest program requests access to the data of the first and second storage blocks the plaintext version of the data may be returned. But when the hypervisor requests access to the data the request may be denied or a ciphertext version of the data may be returned. In one example, the guest program may be a guest operating system executed by a virtual machine that is effected by the deduplication. In another example, the guest program may be a guest kernel executed by another virtual machine that is not effected by the deduplication (e.g., auxiliary virtual machine, lean virtual machine). In either example, each of the virtual machines may share the same common cryptographic input (e.g., shared VM key) for encrypting the data of the storage blocks and the storage blocks may be selected in view of a heuristic that uses access time, modification times, other data, or a combination thereof.

Data comparison module 420 may enable the processing device executing the guest program to compare the data of the first storage block and data of the second storage block. The data of the first storage block and the data of the second storage block may be encrypted using different location dependent cryptographic input. The data may be decrypted and/or encrypted by a hardware device using a cryptographic key that is accessible to the hardware device and inaccessible to the guest program, guest operating systems, hypervisor, host operating system, other program or a combination thereof. The cryptographic key may be based on the location dependent cryptographic input (e.g., storage block specific key) and on a common cryptographic input (e.g., shared VM key). In one example, the different location dependent cryptographic input may correspond to a host physical address of the respective first and second storage blocks.

The comparisons may be done by the guest program and the results of the comparisons may be indicated to the hypervisor. This may be advantageous because the data of the storage blocks may be stored in guest storage of the virtual machines and may be accessible to a process of the virtual machines without being accessible to a process of the hypervisor, host operating system, or another virtual machine (e.g., a VM without access to shared VM key). The processing device may directly or indirectly compare multiple storage blocks. Directly comparing the data may involve comparing data of the first storage block with data of the second storage block. Indirectly comparing the data may involve comparing data that represents the data of the first storage block (e.g., first hash) with data that represents the data of the second storage block (e.g., second hash).

Duplicate determination module 430 may enable the processing device executing the guest program to determine, in view of the comparing, that the first storage block and the second storage block are duplicate storage blocks. In one example, the duplicate storage blocks may be duplicate guest physical memory pages from different virtual machines. Each of the guest physical memory pages may correspond to an underlying hypervisor memory page and the hypervisor memory page may correspond to an underlying memory frame of host memory. The data present in each of the host memory frames may be encrypted using different location based cryptographic input and the resulting ciphertext versions of the data may be different even though the plaintext versions may be the same.

Indication providing module 440 may enable the processing device executing the guest program to provide an indication of the duplicate storage blocks to the hypervisor to cause the duplicate storage blocks to reference a common storage location. In one example, the first and second storage blocks may be added to a set of duplicate storage blocks and the set may be provided to the hypervisor. Providing the indication may involve the guest program making a hypercall to the hypervisor and the hypercall may indicate one or more guest physical addresses of the duplicate storage blocks. The indication may cause the hypervisor to update one or more of the duplicate guest physical memory pages to reference a common physical address in host memory.

The processing device may update the references of the first storage block or second storage block while executing a process or thread of the hypervisor or host operating system. In one example, the first storage block and the second storage block may be duplicate memory pages and updating the reference may remove one of the duplicate memory pages. In one example, updating the reference may involve updating a page table entry (PTE) and invalidating the corresponding entry within a translation lookaside buffer (TLB). The page table entry may correspond to the first storage block and after the update may include a pointer to the physical address of the second storage block instead of the physical address of the first storage block. Updating the reference may also involve invalidating all the page table entries that correspond to the first storage block and the second storage block and flushing the translation lookaside buffer.

Figure 5:
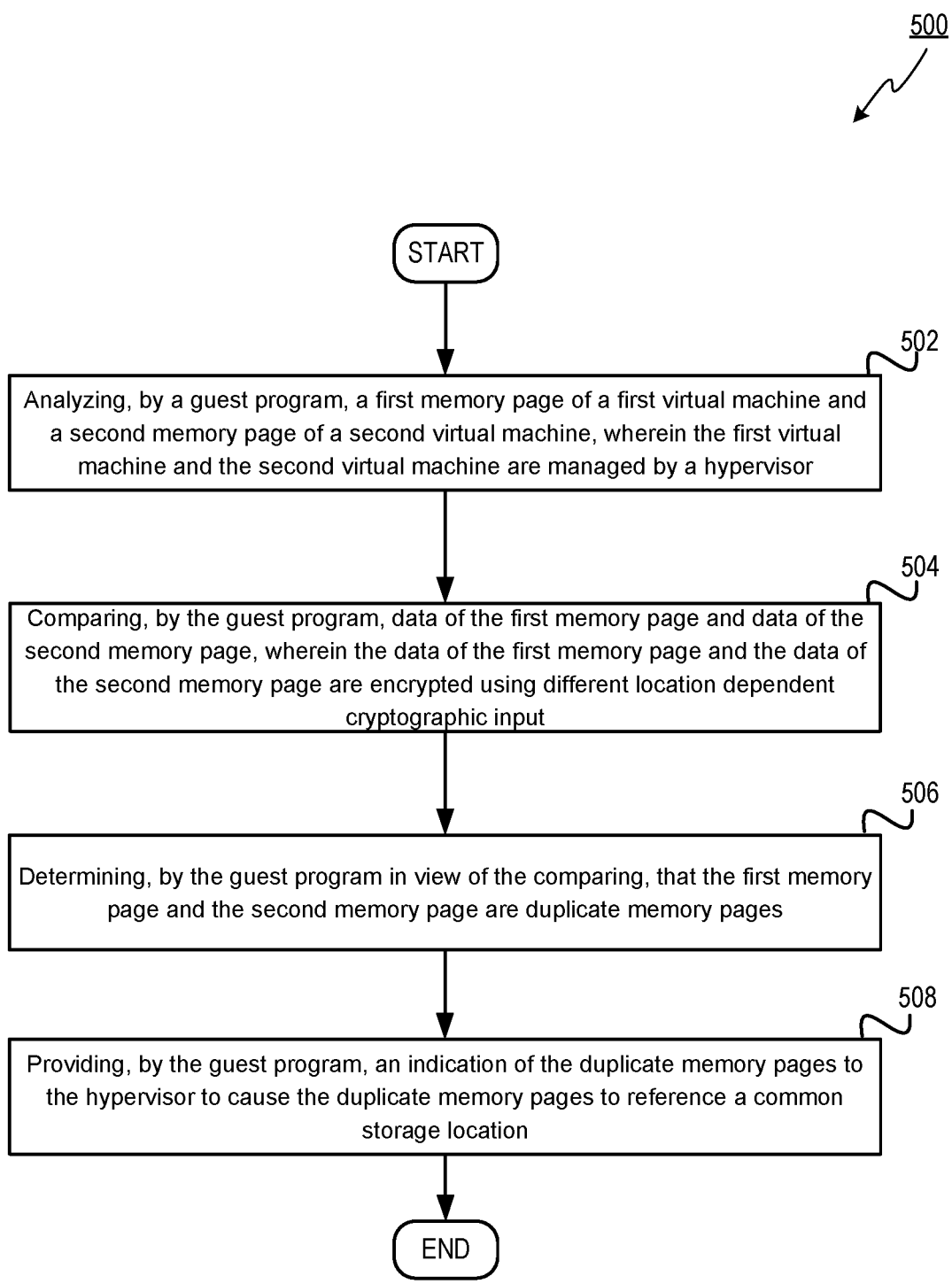
FIG. 5 depicts a flow diagram of another example method for performing data deduplication for encrypted memory, in accordance with one or more aspects of the present disclosure.

FIG. 5 depicts a flow diagram of one illustrative example of a method 500 for performing data deduplication of a storage device while the data on the storage device is encrypted, in accordance with one or more aspects of the present disclosure. Method 500 may be similar to method 300 and may be performed in the same or a similar manner as described above in regards to method 300. Method 500 may be performed by processing devices of a server device or a client device and may begin at block 502.

At block 502, a processing device executing the guest program may analyze a first memory page of a first virtual machine and a second memory page of a second virtual machine. Both the first virtual machine and the second virtual machine may be managed by the same hypervisor, host operating system, or a combination thereof. The first memory page and the second memory page may each include encrypted data that is accessible to the guest program in a decrypted form and is inaccessible to the hypervisor in the decrypted form. For example, when the guest program requests access to the data of the first and second memory pages the plaintext version of the data may be returned. But when the hypervisor requests access to the data the request may be denied or a ciphertext version of the data may be returned. In one example, the guest program may be a guest operating system executed by a virtual machine that is effected by the deduplication. In another example, the guest program may be a guest kernel executed by another virtual machine that is not effected by the deduplication (e.g., auxiliary virtual machine, lean virtual machine). In either example, each of the virtual machines may share the same common cryptographic input (e.g., shared VM key) for encrypting the data of the memory pages and the memory pages may be selected in view of a heuristic that uses access time, modification times, other data, or a combination thereof.

At block 504, the processing device executing the guest program may compare the data of the first memory page and data of the second memory page. The data of the first memory page and the data of the second memory page may be encrypted using different location dependent cryptographic input. The data may be decrypted and/or encrypted by a hardware device using a cryptographic key that is accessible to the hardware device and inaccessible to the guest program, guest operating systems, hypervisor, host operating system, other program or a combination thereof.

The cryptographic key may be based on the location dependent cryptographic input (e.g., memory page specific key) and on a common cryptographic input (e.g., shared VM key). In one example, the different location dependent cryptographic input may correspond to a host physical address of the respective first and second memory pages.

The comparisons may be done by the guest program and the results of the comparisons may be indicated to the hypervisor. This may be advantageous because the data of the memory pages may be stored in guest storage of the virtual machines and may be accessible to a process of the virtual machines without being accessible to a process of the hypervisor, host operating system, or another virtual machine (e.g., a VM without access to shared VM key). The processing device may directly or indirectly compare multiple memory pages. Directly comparing the data may involve comparing data of the first memory page with data of the second memory page. Indirectly comparing the data may involve comparing data that represents the data of the first memory page (e.g., first hash) with data that represents the data of the second memory page (e.g., second hash).

At block 506, the processing device executing the guest program may determine, in view of the comparing, that the first memory page and the second memory page are duplicate memory pages. In one example, the duplicate memory pages may be duplicate guest physical memory pages from different virtual machines. Each of the guest physical memory pages may correspond to an underlying hypervisor memory page and the hypervisor memory page may correspond to an underlying memory frame of host memory. The data present in each of the host memory frames may be encrypted using different location based cryptographic input and the resulting ciphertext versions of the data may be different even though the plaintext versions may be the same.

At block 508, the processing device executing the guest program may provide an indication of the duplicate memory pages to the hypervisor to cause the duplicate memory pages to reference a common storage location. In one example, the first and second memory pages may be added to a set of duplicate memory pages and the set may be provided to the hypervisor. Providing the indication may involve the guest program making a hypercall to the hypervisor and the hypercall may indicate one or more guest physical addresses of the duplicate memory pages. The indication may cause the hypervisor to update one or more of the duplicate guest physical memory pages to reference a common physical address in host memory.

The processing device may update the references of the first memory page or second memory page while executing a process or thread of the hypervisor or host operating system. In one example, the first memory page and the second memory page may be duplicate memory pages and updating the reference may remove one of the duplicate memory pages. In one example, updating the reference may involve updating a page table entry (PTE) and invalidating the corresponding entry within a translation lookaside buffer (TLB). The page table entry may correspond to the first memory page and after the update may include a pointer to the physical address of the second memory page instead of the physical address of the first memory page. Updating the reference may also involve invalidating all the page table entries that correspond to the first memory page and the second memory page and flushing the translation lookaside buffer. Responsive to completing the operations described herein above with references to block 508, the method may terminate.

Figure 6:
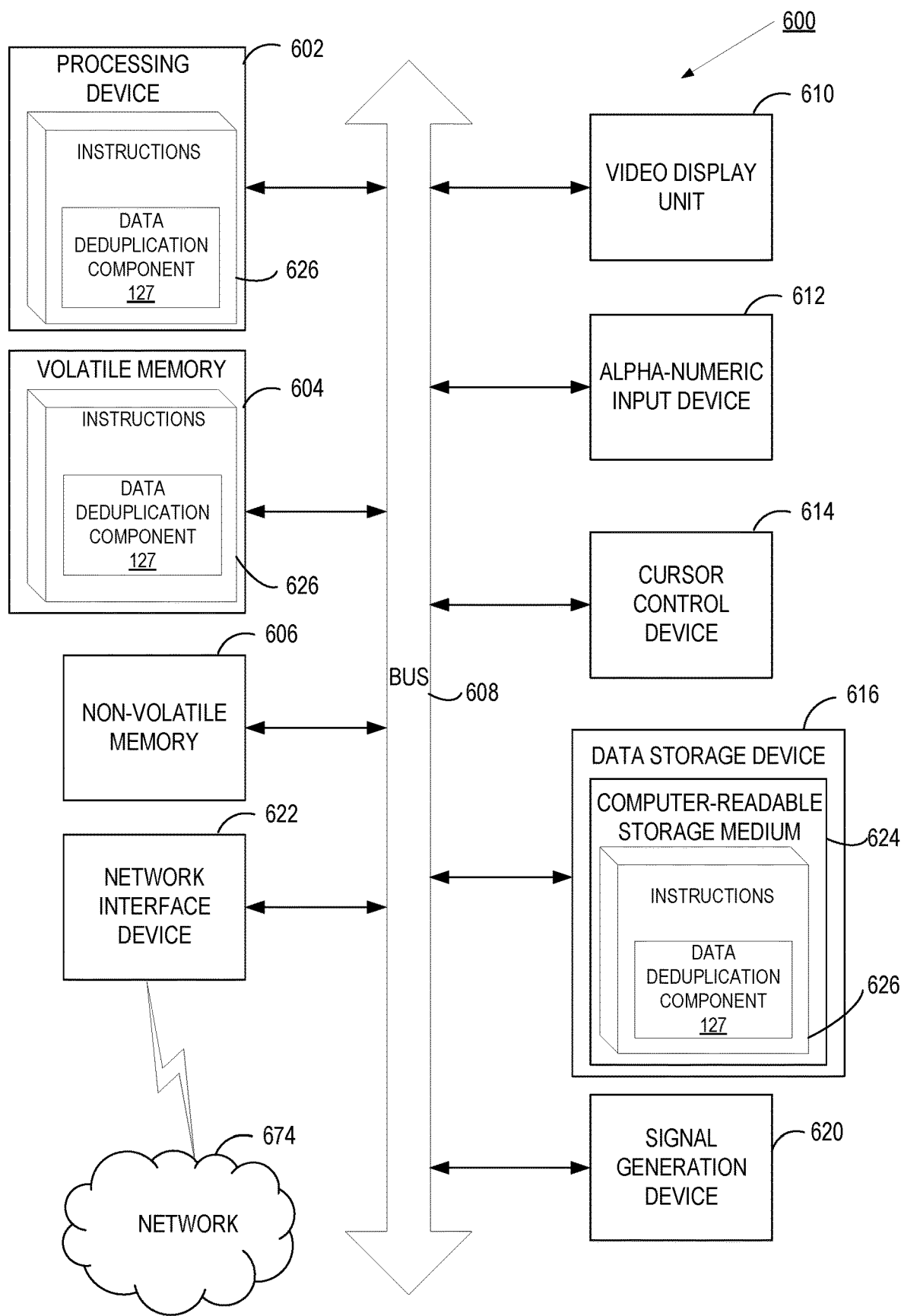
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 500 and for encoding data deduplication component 127 of FIGS. 1 and 2.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   analyzing, by a processing device executing a guest program, a first storage block of a first virtual machine and a second storage block of a second virtual machine, wherein the first virtual machine and the second virtual machine are managed by a hypervisor;
   comparing, by the guest program, data of the first storage block and data of the second storage block, wherein the data of the first storage block and the data of the second storage block are encrypted using different location dependent cryptographic input;
   determining, by the guest program in view of the comparing, that the first storage block and the second storage block are duplicate storage blocks; and
   providing, by the guest program, an indication of the duplicate storage blocks to the hypervisor to cause the duplicate storage blocks to reference a common storage location.

2. The method of claim 1, wherein the duplicate storage blocks are duplicate guest physical memory pages from different virtual machines and wherein the processing device updates at least one of the duplicate guest physical memory pages to cause the guest physical memory pages to reference a common physical address in host memory.

3. The method of claim 1, wherein providing the indication comprises the guest program making a hypercall to the hypervisor, wherein the hypercall indicates one or more guest physical addresses of the duplicate storage blocks.

4. The method of claim 1, wherein the first storage block and the second storage block comprise encrypted data that is accessible to the guest program in a decrypted form and is inaccessible to the hypervisor in the decrypted form.

5. The method of claim 1, wherein the first storage block and the second storage block comprise data that is decrypted by a hardware device using a cryptographic key that is inaccessible to the hypervisor, wherein the cryptographic key is based on a common cryptographic input and a location dependent cryptographic input.

6. The method of claim 1, wherein the guest program is a guest operating system executed by the first virtual machine and wherein the first virtual machine and the second virtual machine share a common cryptographic input for encrypting the data of the first and second storage blocks.

7. The method of claim 1, wherein the guest program is a guest kernel executed by a third virtual machine and wherein the first virtual machine, the second virtual machine, and the third virtual machine share a common cryptographic input for encrypting the data of the first and second storage blocks.

8. The method of claim 1, wherein the different location dependent cryptographic input corresponds to respective host physical addresses of the first and the second storage blocks.

9. The method of claim 1, further comprising selecting the first storage block of the first virtual machine and the second storage block of the second virtual machine in view of a heuristic that uses a modification time of the first storage block and a modification time of the second storage block.

10. The method of claim 1, further comprising:
    adding the first storage block and the second storage block to a set of duplicate storage blocks; and
    providing the hypervisor with the set of duplicate storage blocks.

11. A system comprising:
    a memory; and a processing device communicably coupled to the memory, the processing device to:
- analyze, by a guest program, a first storage block of a first virtual machine and a second storage block of a second virtual machine, wherein the first virtual machine and the second virtual machine are managed by a hypervisor;
- compare, by the guest program, data of the first storage block and data of the second storage block, wherein the data of the first storage block and the data of the second storage block are encrypted using different location dependent cryptographic input;
- determine, by the guest program in view of the comparing, that the first storage block and the second storage block are duplicate storage blocks; and
- provide, by the guest program, an indication of the duplicate storage blocks to the hypervisor to cause the duplicate storage blocks to reference a common storage location.

12. The system of claim 11, wherein the duplicate storage blocks are duplicate guest physical memory pages from different virtual machines and wherein the processing device updates at least one of the duplicate guest physical memory pages to cause the guest physical memory pages to reference a common physical address in host memory.

13. The system of claim 11, wherein to provide the indication, the processing device is to make a hypercall, wherein the hypercall indicates one or more guest physical addresses of the duplicate storage blocks.

14. The system of claim 11, wherein the first storage block and the second storage block comprise encrypted data that is accessible to the guest program in a decrypted form and is inaccessible to the hypervisor in the decrypted form.

15. The system of claim 11, wherein the first storage block and the second storage block comprise data that is decrypted by a hardware device using a cryptographic key that is inaccessible to the hypervisor, wherein the cryptographic key is based on a common cryptographic input and a location dependent cryptographic input.

16. A non-transitory machine-readable storage medium storing instructions which, when executed, cause a processing device to perform operations comprising:
- analyzing, by the processing device executing a guest program, a first memory page of a first virtual machine and a second memory page of a second virtual machine, wherein the first virtual machine and the second virtual machine are managed by a hypervisor;
- comparing, by the guest program, data of the first memory page and data of the second memory page, wherein the data of the first memory page and the data of the second memory page are encrypted using different location dependent cryptographic input;
- determining, by the guest program in view of the comparing, that the first memory page and the second memory page are duplicate memory pages; and
- providing, by the guest program, an indication of the duplicate memory pages to the hypervisor to cause the duplicate memory pages to reference a common storage location.

17. The non-transitory machine-readable storage medium of claim 16, wherein the duplicate memory pages are duplicate guest physical memory pages from different virtual machines and wherein the processing device updates at least one of the duplicate guest physical memory pages to cause the guest physical memory pages to reference a common physical address in host memory.

18. The non-transitory machine-readable storage medium of claim 16, wherein providing the indication comprises the guest program making a hypercall to the hypervisor, wherein the hypercall indicates one or more guest physical addresses of the duplicate memory pages.

19. The non-transitory machine-readable storage medium of claim 16, wherein the first memory page and the second memory page comprise encrypted data that is accessible to the guest program in a decrypted form and is inaccessible to the hypervisor in the decrypted form.

20. The non-transitory machine-readable storage medium of claim 16, wherein the first memory page and the second memory page comprise data that is decrypted by a hardware device using a cryptographic key that is inaccessible to the hypervisor, wherein the cryptographic key is based on a common cryptographic input and a location dependent cryptographic input.

* * * * *